UNITED STATES PATENT OFFICE.

ALFRED E. HUNT, OF NASHUA, NEW HAMPSHIRE.

FIRE-BRICK.

SPECIFICATION forming part of Letters Patent No. 228,901, dated June 15, 1880.

Application filed May 20, 1880. (No model.)

*To all whom it may concern:*

Be it known that I, ALFRED E. HUNT, of Nashua, in the county of Hillsborough and State of New Hampshire, have invented certain new and useful Improvements in the Manufacture of Fire-Brick, of which the following is a specification.

The object of my invention is to produce a fire-brick which shall be extremely infusible, or capable of resisting very high and long-continued heats, and which may be easily worked into shape and produced at very small expense.

To this end my invention consists in a certain new composition of matter, which is composed of the following ingredients, in the proportions hereinafter specified.

I take of silex, or of any stone which is composed of nearly pure silica, one hundred parts, the stone being pulverized sufficiently fine so that the particles will pass through a sieve having one-eighth ($\frac{1}{8}$) of an inch mesh. To these one hundred (100) parts of pulverized silex I add about four parts of lime, the mixture being conveniently effected in a common slaking-bin. Sufficient water is added to slake the lime and permeate the mass, and the whole is worked over until a thorough and intimate mixture is effected, when it is placed in molds and shaped, under pressure, into bricks of suitable size and proportions. The molded brick is then dried and baked in the usual manner.

If desired, a small percentage of fire-clay may be added to the above-specified parts, although I do not consider this as absolutely essential.

In those cases where the clay is used, however, the formula would be as follows, viz: one hundred (100) parts silex, pulverized, four (4) parts of lime, and of fire-clay two (2) parts.

I consider, nevertheless, that my invention consists, essentially, of the composition first above described, viz: one hundred (100) parts of silex, or of some stone composed of nearly pure silica, and four (4) parts of lime, treated in the manner specified.

Brick made by this formula are remarkably infusible. This quality is owing to the proportion of the lime with relation to the silica, since if the lime were present in excess the principal object of the invention would be frustrated, since when the lime is present in larger proportion it forms a fusible flux for the silica, especially when clay is also present.

In practicing my invention I prefer to use stone taken from ledges in the town of Lyndeborough, in the State of New Hampshire. This stone is pure, or nearly pure, silex, as I have ascertained that it contains over ninety-nine (99) per cent. of pure silica. The mineral is present in the locality named in great abundance, is easily quarried, and inexpensive.

By my invention I am able to produce a fire-brick which I have found by careful trial superior to the best quality of brick imported into this country for use in open-hearth and reverberatory furnaces.

From the nature of the material employed, as well as from the simplicity of manipulation in carrying out my invention, I can produce an extremely refractory brick at a very low cost.

Having thus fully described my invention, what I claim as new, and desire to secure by Letters Patent of the United States, is—

A composition of matter for fire-brick consisting of one hundred (100) parts of silex, pulverized, and four (4) parts of lime, mingled and treated in the manner and for the purpose substantially described.

In testimony whereof I have signed my name to this specification in the presence of two subscribing witnesses.

ALFRED E. HUNT.

Witnesses:
 L. L. TILDEN,
 CHAS. B. TILDEN.